US 6,715,452 B1

(12) United States Patent  (10) Patent No.: US 6,715,452 B1
Taylor, III et al.  (45) Date of Patent: Apr. 6, 2004

(54) METHOD AND APPARATUS FOR SHUTTING DOWN A FUEL REFORMER

(75) Inventors: William Taylor, III, Columbus, IN (US); Rudolf M. Smaling, Bedford, MA (US); Shawn D. Bauer, Indianapolis, IN (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/293,518

(22) Filed: Nov. 13, 2002

(51) Int. Cl.[7] ................................................ F02B 43/08
(52) U.S. Cl. ........................................................ 123/3
(58) Field of Search ............................ 123/3, DIG. 12, 123/1 A, 538, 536, 537

(56) References Cited

U.S. PATENT DOCUMENTS

| | | |
|---|---|---|
| 2,787,730 A | 4/1957 | Berghaus et al. |
| 3,018,409 A | 1/1962 | Berghaus et al. |
| 3,035,205 A | 5/1962 | Berghaus et al. |
| 3,423,562 A | 1/1969 | Jones et al. |
| 3,594,609 A | 7/1971 | Vas |
| 3,622,493 A | 11/1971 | Crusco |
| 3,649,195 A | 3/1972 | Cook et al. |
| 3,755,131 A | 8/1973 | Shalit |
| 3,779,182 A | 12/1973 | Camacho |
| 3,841,239 A | 10/1974 | Nakamura et al. |
| 3,879,680 A | 4/1975 | Naismith et al. |
| 3,894,605 A | 7/1975 | Salvadorini |
| 3,982,962 A | 9/1976 | Bloomfield |
| 3,992,277 A | 11/1976 | Trieschmann et al. |
| 4,033,133 A | 7/1977 | Houseman et al. |
| 4,036,131 A | 7/1977 | Elmore |
| 4,036,181 A | 7/1977 | Matovich |
| 4,059,416 A | 11/1977 | Matovich |
| 4,099,489 A | 7/1978 | Bradley |
| 4,144,444 A | 3/1979 | Dementiev et al. |
| 4,168,296 A | 9/1979 | Lundquist |
| 4,339,546 A | 7/1982 | Randalls |
| 4,436,793 A | 3/1984 | Adlhart |
| 4,458,634 A | 7/1984 | Carr et al. |
| 4,469,932 A | 9/1984 | Spiegelberg et al. |
| 4,473,622 A | 9/1984 | Chuldzinski et al. |
| 4,522,894 A | 6/1985 | Hwang et al. |
| 4,578,955 A | 4/1986 | Medina |
| 4,625,511 A | 12/1986 | Scheitlin et al. |
| 4,625,681 A | 12/1986 | Sutekiyo |
| 4,645,521 A | 2/1987 | Freesh |
| 4,651,524 A | 3/1987 | Brighton |
| 4,657,829 A | 4/1987 | McElroy et al. |
| 4,830,492 A | 5/1989 | Ko |
| 4,841,925 A | 6/1989 | Ward |

(List continued on next page.)

FOREIGN PATENT DOCUMENTS

| | | |
|---|---|---|
| DD | 237120 A1 | 7/1986 |
| DE | 237120 A1 | 6/1924 |
| DE | 30 48 540 | 7/1982 |

(List continued on next page.)

OTHER PUBLICATIONS

Jahn, "Physics of Electric Propulsion", pp. 126–130 (1968).
Belogub et al., "Petrol–Hydrogen Truck With Load–Carrying Capacity 5 Tons", Int. J. Hydrogen Energy, vol. 16, No. 6, pp. 423–426 (1991).
Breshears et al., "Partial Hydrogen Injection Into Internal Combustion Engines", Proceedings of the EPA 1st Symposium on Low Pollution Power Systems and Development, Ann Arbor, Mich., pp. 268–277 (Oct. 1973).

(List continued on next page.)

Primary Examiner—Tony M. Argenbright
Assistant Examiner—Hyder Ali
(74) Attorney, Agent, or Firm—Barnes & Thornburg

(57) ABSTRACT

A method of operating a power system including a fuel reformer and an internal combustion engine is disclosed. The engine is shutdown subsequent to shutdown of the fuel reformer. A fuel reformer system for supplying a reformate gas to the engine is also disclosed.

18 Claims, 4 Drawing Sheets

U.S. PATENT DOCUMENTS

| | | | |
|---|---|---|---|
| 4,928,227 A | | 5/1990 | Burba et al. |
| 4,963,792 A | | 10/1990 | Parker |
| 4,967,118 A | | 10/1990 | Urataki et al. |
| 5,092,281 A | * | 3/1992 | Iwaki et al. .................. 123/3 |
| 5,095,247 A | | 3/1992 | Hanamura |
| 5,138,959 A | | 8/1992 | Kulkarni |
| 5,143,025 A | | 9/1992 | Munday |
| 5,159,900 A | | 11/1992 | Dammann |
| 5,205,912 A | | 4/1993 | Murphy |
| 5,207,185 A | | 5/1993 | Greiner et al. |
| 5,212,431 A | | 5/1993 | Origuchi et al. |
| 5,228,529 A | | 7/1993 | Rosner |
| 5,272,871 A | | 12/1993 | Oshima et al. |
| 5,284,503 A | | 2/1994 | Bitler et al. |
| 5,293,743 A | | 3/1994 | Usleman et al. |
| 5,317,996 A | | 6/1994 | Lansing |
| 5,362,939 A | | 11/1994 | Hanus et al. |
| 5,409,784 A | | 4/1995 | Bromberg et al. |
| 5,409,785 A | | 4/1995 | Nakano et al. |
| 5,412,946 A | | 5/1995 | Oshima et al. |
| 5,425,332 A | | 6/1995 | Rabinovich et al. |
| 5,437,250 A | | 8/1995 | Rabinovich et al. |
| 5,441,401 A | | 8/1995 | Yamaguro et al. |
| 5,445,841 A | | 8/1995 | Arendt et al. |
| 5,451,740 A | | 9/1995 | Hanus et al. |
| 5,560,890 A | | 10/1996 | Berman et al. |
| 5,599,758 A | | 2/1997 | Guth et al. |
| 5,660,602 A | | 8/1997 | Collier, Jr. et al. |
| 5,666,923 A | | 9/1997 | Collier, Jr. et al. |
| 5,785,136 A | * | 7/1998 | Falkenmayer et al. ..... 180/65.2 |
| 5,787,864 A | | 8/1998 | Collier, Jr. et al. |
| 5,813,222 A | | 9/1998 | Appleby |
| 5,826,548 A | | 10/1998 | Richardson, Jr. |
| 5,845,485 A | | 12/1998 | Murphy et al. |
| 5,847,353 A | | 12/1998 | Titus et al. |
| 5,852,927 A | | 12/1998 | Cohn et al. |
| 5,887,554 A | | 3/1999 | Cohn et al. |
| 5,894,725 A | | 4/1999 | Cullen et al. |
| 5,910,097 A | | 6/1999 | Boegner et al. |
| 5,921,076 A | | 7/1999 | Krutzsch et al. |
| 5,974,791 A | | 11/1999 | Hirota et al. |
| 6,012,326 A | | 1/2000 | Raybone et al. |
| 6,014,593 A | | 1/2000 | Grufman |
| 6,047,543 A | | 4/2000 | Caren et al. |
| 6,048,500 A | | 4/2000 | Caren et al. |
| 6,082,102 A | | 7/2000 | Wissler et al. |
| 6,122,909 A | | 9/2000 | Murphy et al. |
| 6,125,629 A | | 10/2000 | Patchett |
| 6,130,260 A | | 10/2000 | Hall et al. |
| 6,134,882 A | | 10/2000 | Huynh et al. |
| 6,152,118 A | | 11/2000 | Sasaki et al. |
| 6,235,254 B1 | | 5/2001 | Murphy et al. |
| 6,248,684 B1 | | 6/2001 | Yavuz et al. |
| 6,284,157 B1 | | 9/2001 | Eliasson et al. |
| 6,311,232 B1 | | 10/2001 | Cagle et al. |
| 6,322,757 B1 | | 11/2001 | Cohn et al. |
| 2002/0012618 A1 | | 1/2002 | Bromberg et al. |
| 2002/0194835 A1 | | 12/2002 | Bromberg et al. |

FOREIGN PATENT DOCUMENTS

| | | |
|---|---|---|
| DE | 195 10 804 | 9/1996 |
| DE | 19644864 | 5/1998 |
| DE | 19644864 A1 | 5/1998 |
| DE | 197 57 936 | 7/1999 |
| DE | 19927518 | 1/2001 |
| EP | 0096538 | 12/1983 |
| EP | 0153116 | 8/1985 |
| EP | 0485922 A1 | 5/1992 |
| EP | 1030395 | 8/2000 |
| EP | 1057998 | 12/2000 |
| FR | 2593493 | 7/1987 |
| FR | 2620436 | 3/1989 |
| GB | 355210 | 2/1930 |
| GB | 1221317 | 2/1971 |
| GB | 2241746 | 9/1991 |
| JP | 51 27630 | 3/1976 |
| JP | 51 27630 | 8/1976 |
| JP | 02 121300 | 5/1990 |
| JP | 03195305 | 8/1991 |
| JP | 05 231242 | 9/1993 |
| JP | 07 292372 | 11/1995 |
| SU | 1519762 | 11/1989 |
| WO | WO 94/03263 | 2/1994 |
| WO | WO 85/00159 | 1/1995 |
| WO | WO 95/06194 | 3/1995 |
| WO | WO 96/24441 | 8/1996 |
| WO | WO 98/45582 | 10/1998 |
| WO | WO 00/26518 | 5/2000 |
| WO | WO 01/14702 A1 | 3/2001 |
| WO | WO 91/14698 A1 | 3/2001 |
| WO | WO 01/33056 A1 | 5/2001 |

OTHER PUBLICATIONS

Chuveliov et al., "Comparison of Alternative Energy Technologies Utilizing Fossil Fuels and Hydrogen Based on Their Damage to Population and Environment in the USSR and East Europe", pp. 269–300.

Correa, "Lean Premixed Combustion for Gas–Turbines: Review and Required Research", PD–vol. 33, Fossile Fuel Combustion, ASME, pp. 1–9 (1991).

Czernichowski et al., "Multi–Electrodes High Pressure Gliding Discharge Reactor and its Applications for Some Waste Gas and Vapor Incineration", Proceedings of Workshop on Plasma Destruction of Wastes, France, pp. 1–13 (1990).

Das, "Exhaust Emission Characterization of Hydrogen–Operated Engine System: Nature of Pullutants and their Control Techniques", Int. J. Hydrogen Energy, vol. 16, No. 11, pp. 765–775 (1991).

Das, "Hydrogen Engines: A View of the Past and a Look into the Future", Int. J. of Hydrogen Energy, vol. 15, No. 6, pp. 425–443 (1990).

Rabinovich et al., "Plasmatron Internal Combustion Engine System for Vehicle Pollution Reduction", Int. J. of Vehicle Design, vol. 15, Nos. 3/4/5, pp. 234–242 (1994).

Scott et al., "Hydrogen Fuel Breakthrough with On–Demand Gas Generator", 372 Automotive Engineering, vol. 93, No. 8, Warrendale, Pa., U.S.A., pp. 81–84 (August 1985).

Shabalina et al., "Slag Cleaning by Use of Plasma Heating", pp. 1–7.

Handbook of Thermodynamic High Temperature Process Data, pp. 507–547.

Varde et al., "Reduction of Soot in Diesel Combustion with Hydrogen and Different H/C Gaseous Fuels", Hydrogen Energy Progress V, pp. 1631–1639.

Wang et al., "Emission Control Cost Effectiveness of Alternative–Fuel Vehicles", Society of Automotive Engineers, Paper 931786, pp. 91–122 (1993).

Wilson, "Turbine Cars", Technology Review, pp. 50–56 (Feb./Mar., 1995).

Tachtler, "Fuel Cell Auxiliary Power Unit—Innovation for the Electric Supply of Passenger Cars?", Society of Automotive Engineers, Paper No. 2000–01–0374, pp. 109–117 (2000).

Kirwan, "Fast Start–Up On–Board Gasoline Reformer for Near Zero Emissions in Spark–Ignition Engines", Society of Automotive Engineers World Congress, Detroit, Mich. (Mar. 4–7, 2002), Paper No. 2002–01–1011.

Bromberg, "Emissions Reductions Using Hydrogen from Plasmatron Fuel Converters", Int. J. of Hydrogen Energy 26, pp. 1115–1121 (2001).

Bromberg, "Experimental Evaluation of SI Engine Operation Supplemented by Hydrogen Rich Gas from a Compact Plasma Boosted Reformer", Massachusetts Institute of Technology Plasma Science and Fusion Center Report, JA–99–32 (1999).

Bromberg, "Compact Plasmatron–Boosted Hydrogen Generation Technology for Vehicular Applications", Int. J. of Hydrogen Energy 24, pp 341–350 (1999).

Gore, "Hydrogen A Go–Go", Discover, p. 92–93, (Jul., 1999).

Burch, "An Investigation of the $NO/H_2/O_2$ Reaction on Nobel–Metal Catalysts at Low Temperatures Under Lean–Burn Conditions," Journal of Applied Catalysis B: Environmental 23, pp. 115–121 (1999).

Costa, "An Investigation of the $No/H_2/O_2$ (Lean De–$No_x$) Reaction on a Highly Active and Selective $Pt/La_{0.7}Sr_{0.2}Ce_{0.1}FeO_3$ Catalyst at Low Temperatures", Journal of Catalysis 209, pp. 456–471 (2002).

Kirwan, "Development of a Fast Start–up O Gasoline Reformer for Near Zero Spark–Ignition Engines", Delphi Automotive Systems, pp. 1–21 (2002)

Shelef, "Twenty–five Years after Introduction of Automotive Catalysts: What Next?" Journal of Catalysis Today 62, pp. 35–50 (2000).

Koebel, "Selective Catalytic Reduction of NO and $NO_2$ at Low Temperatures", Journal of Catalysis Today 73, pp. 239–247 (2002).

Frank, "Kinetics and Mechanism of the Reduction of Nitric Oxides by $H_2$ Under Lean–Burn Conditions on a Pt–Mo–Co/$\alpha$–$Al_2O_3$ Catalyst", Journal of Applied Catalysis B: Environmental 19, pp. 45–57 (1998).

Nanba, "Product Analysis of Selective Catalytic Reduction of $NO_2$ with $C_2H_4$ Over H–Ferrierite", Journal of Catalysis 211, pp. 53–63 (2002).

Simanaitis, "Whither the Automobile?", Road and Track, pp. 98–102 (Sep. 2001).

Stokes, "A Gasoline Engine Concept for Improved Fuel Economy—The Lean Boost System", International Falls Fuels and Lubricants Meeting and Exposition, Baltimore, Md., SAE Technical Paper Series, 14 pages (Oct. 16–19, 2000).

Chandler, "Device May Spark Clean–Running Cars", The Boston Globe, p. E1 (Jul. 12, 1999).

Kaske et al., "Hydrogen Production by the Hüls Plasma–Reforming Process", Proc. VI World Hydrogen Energy Conference, vol. 1, pp. 185–190 (1986).

MacDonald, "Evaluation of Hydrogen–Supplemented Fuel Concept with an Experimental Multi–Cylinder Engine", Society of Automotive Engineers, Paper 760101, pp. 1–16 (1976).

Mackay, "Development of a 24 kW Gas Turbine–Driven Generator Set for Hybrid Vehicles", 940510, pp. 99–105, NoMac Energy Systems, Inc.

Mackay, "Hybrid Vehicle Gas Turbines", 930044, pp. 35–41, NoMac Energy Systems, Inc.

Matthews et al., "Further Analysis of Railplugs as a New Type of Ignitor", SAE Paper 922167, pp. 1851–1862 (1992).

Mishchenko et al., "Hydrogen as a Fuel for Road Vehicles", Proc. VII World Hydrogen Energy Conference, vol. 3, pp. 2037–2056 (1988).

Monroe et al., "Evaluation of a Cu/Zeolite Catalyst to Remove $NO_x$ from Lean Exhaust", Society of Automotive Engineers, Paper 930737, pp. 195–203 (1993).

Rabinovich et al., "On Board Plasmatron Generation of Hydrogen Rich Gas for Engine Pollution Reduction", Proceedings of NIST Workshop on Advanced Components for Electric and Hybrid Electric Vehicles, Gaithersburg, Md., pp. 83–88 (Oct. 1993) (not published).

Das, "Fuel Induction Techniques for a Hydrogen Operated Engine", Int. J. of Hydrogen Energy, vol. 15, No. 11 (1990).

DeLuchi, "Hydrogen Vehicles: An Evaluation of Fuel Storage, Performance, Safety, Environmental Implants and Costs", Int. J. Hydrogen Energy, vol. 14, No. 2, pp. 81–130 (1989).

Duclos et al., "Diagnostic Studies of a Pinch Plasma Accelerator", AIAA Journal, vol. 1, No. 11, pp. 2505–2513 (Nov. 1963).

Feucht et al., "Hydrogen Drive for Road Vehicles—Results from the Fleet Test Run in Berlin", Int. J. Hydrogen Energy, vol. 13, No. 4, pp. 243–250 (1988).

Finegold et al., "Dissociated Methanol as a Consumable Hydride for Automobiles and Gas Turbines", pp. 1359–1369, Advances in Hydrogen Energy 3 (Jun. 13–17, 1982).

Hall et al., "Initial Studies of a New Type of Ignitor: The Railplug"—SAE Paper 912319, pp. 1730–1746 (1991).

Houseman et al., "Hydrogen Engines Based On Liquid Fuels, A Review", G.E., Proc., $3^{rd}$ World Hydrogen Energy Conf., pp. 949–968 (1980).

Houseman, et al., "Two Stage Combustion for Low Emissions Without Catalytic Converters", Proc. of Automobile Engineering Meeting, Dearborn, Mich., pp. 1–9 (Oct. 18–22, 1976).

Jones, et al., "Exhaust Gas Reforming of Hydrocarbon Fuels", Soc. of Automotive Engineers, Paper 931086, pp. 223–234 (1993).

* cited by examiner

METHOD AND APPARATUS FOR SHUTTING DOWN A FUEL REFORMER

FIELD OF THE DISCLOSURE

The present disclosure relates generally to fuel reformers and systems and methods associated therewith.

BACKGROUND OF THE DISCLOSURE

A fuel reformer is used to reform a hydrocarbon fuel into a reformate gas. In the case of an onboard fuel reformer or a fuel reformer associated with a stationary power generator, the reformate gas produced by the fuel reformer may be utilized as fuel or fuel additive in the operation of an internal combustion engine. The reformate gas may also be utilized to regenerate or otherwise condition an emission abatement device associated with an internal combustion engine or as a fuel for a fuel cell.

SUMMARY OF THE DISCLOSURE

According to one aspect of the disclosure, there is provided a method of operating a power system. The power system includes a fuel reformer and an internal combustion engine. During operation of the fuel reformer, reformate gas produced by the fuel reformer is discharged into a passageway. To purge the passageway of the reformate gas, the engine is operated for a period of time subsequent to cessation of operation of the fuel reformer.

According to another aspect of the disclosure, a fuel reformer system for supplying a reformate gas to an internal combustion engine includes the fuel reformer and a reformer controller. The reformer controller detects an engine shutdown request and ceases operation of the fuel reformer in response to detection of the shutdown request, but prior to cessation of operation of the internal combustion engine.

DETAILED DESCRIPTION OF ILLUSTRATIVE EMBODIMENTS

Figure 1:
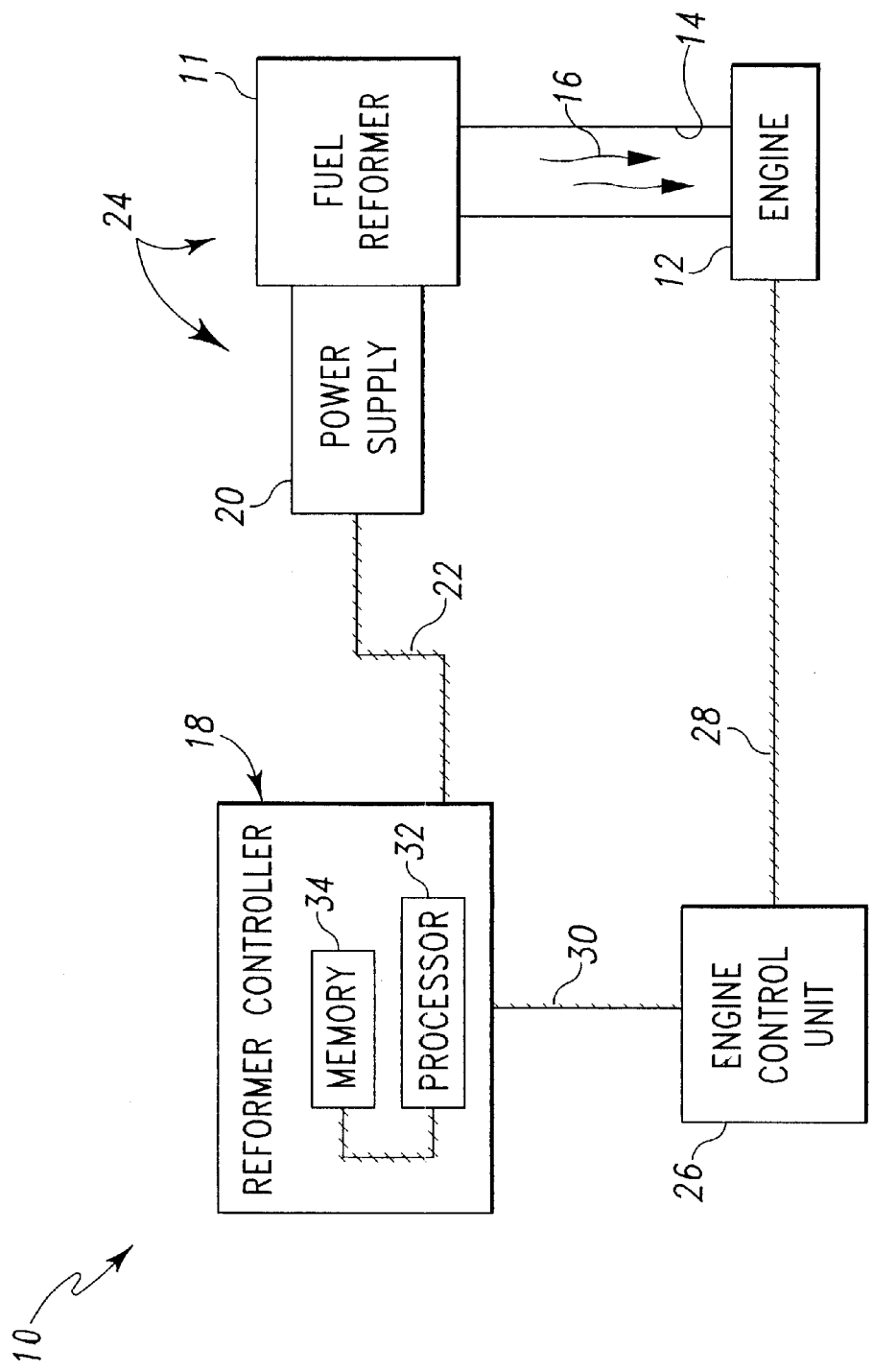
FIG. 1 is a simplified block diagram of a power system including a fuel reformer, an internal combustion engine, and a passageway to conduct a reformate gas produced by the fuel reformer to the engine wherein the fuel reformer is under the control of a reformer controller and the engine is under the control of an engine control unit which is discrete from the reformer controller.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the disclosure as defined by the appended claims.

Referring now to FIG. 1, there is shown a power system 10. The power system 10 includes a fuel reformer 11 and an internal combustion engine 12. A passageway 14 interconnects the fuel reformer 11 and the engine 12. The fuel reformer 11 reforms (i.e., converts) hydrocarbon fuel into a reformate gas 16 that includes, among other things, hydrogen gas. The passageway 14 conducts the reformate gas 16 to the engine 12 so that the reformate gas 16 may be used as a fuel or a fuel additive in the operation of the engine 12 thereby increasing the efficiency of the engine 12 while also reducing emissions produced by the engine 12.

The fuel reformer 11 may be embodied as any type of fuel reformer such as, for example, a catalytic fuel reformer, a thermal fuel reformer, a steam fuel reformer, or any other type of partial oxidation fuel reformer. The fuel reformer 11 may also be embodied as a plasma fuel reformer. A plasma fuel reformer uses plasma to convert a mixture of air and hydrocarbon fuel into a reformate gas which is rich in, among other things, hydrogen gas and carbon monoxide. Systems including plasma fuel reformers are disclosed in U.S. Pat. No. 5,425,332 issued to Rabinovich et al.; U.S. Pat. No. 5,437,250 issued to Rabinovich et al.; U.S. Pat. No. 5,409,784 issued to Bromberg et al.; and U.S. Pat. No. 5,887,554 issued to Cohn, et al., the disclosures of which are hereby incorporated by reference.

As shown in FIG. 1, the fuel reformer 11 and its associated components are under the control of the reformer controller 18. In particular, components such as temperature, pressure, or gas composition sensors (not shown), a fuel inlet assembly such as a fuel injector (not shown), and air inlet valve(s) (not shown) are each electrically coupled to the reformer controller 18. Moreover, the power supply 20 is electrically coupled to the reformer controller 18 via a signal line 22. Although the signal line 22 is shown schematically as a single line, it should be appreciated that the signal line 22, along with the signal line associated with each of the other components of the fuel reformer 11, may be configured as any type of signal carrying assembly which allows for the transmission of electrical signals in either one or both directions between the reformer controller 18 and the corresponding component. For example, any one or more of the signal lines may be embodied as a wiring harness having a number of signal lines which transmit electrical signals between the reformer controller 18 and the corresponding component. It should be appreciated that any number of other wiring configurations may also be used. For example, individual signal wires may be used, or a system utilizing a signal multiplexer may be used for the design of any one or more of the signal lines. Moreover, the signal lines may be integrated such that a single harness or system is utilized to electrically couple some or all of the components associated with the fuel reformer 11 to the reformer controller 18.

The reformer controller 18 is, in essence, the master computer responsible for interpreting electrical signals sent by sensors associated with the fuel reformer 11 and for activating electronically-controlled components associated with the fuel reformer 11 in order to control the fuel reformer 11. For example, the reformer controller 18 of the present disclosure is operable to, amongst many other things, actuate or shutdown the fuel reformer 11, determine the beginning and end of each injection cycle of fuel into the fuel reformer 11, calculate and control the amount and ratio of air and fuel to be introduced into the fuel reformer 11, determine the temperature of the fuel reformer 11, and determine the power level to supply to the fuel reformer 11.

To do so, the reformer controller 18 includes a number of electronic components commonly associated with electronic units which are utilized in the control of electromechanical systems. For example, the reformer controller 18 may include, amongst other components customarily included in such devices, a processor such as a microprocessor 32 and a memory device 34 such as a programmable read-only memory device ("PROM") including erasable PROM's (EPROM's or EEPROM's). The memory device 34 is provided to store, amongst other things, instructions in the form of, for example, a software routine (or routines) which, when executed by the microprocessor 32, allows the reformer controller 18 to control operation of the fuel reformer 11.

The reformer controller 18 also includes an analog interface circuit (not shown). The analog interface circuit converts the output signals from the various fuel reformer sensors into a signal which is suitable for presentation to an input of the microprocessor 32. In particular, the analog interface circuit, by use of an analog-to-digital (A/D) converter (not shown) or the like, converts the analog signals generated by the sensors into a digital signal for use by the microprocessor 32. It should be appreciated that the A/D converter may be embodied as a discrete device or number of devices, or may be integrated into the microprocessor. It should also be appreciated that if any one or more of the sensors associated with the fuel reformer 11 generate a digital output signal, the analog interface circuit may be bypassed.

Similarly, the analog interface circuit converts signals from the microprocessor 32 into an output signal which is suitable for presentation to the electrically-controlled components associated with the fuel reformer 11 (e.g., the power supply 20). In particular, the analog interface circuit, by use of a digital-to-analog (D/A) converter (not shown) or the like, converts the digital signals generated by the microprocessor 32 into analog signals for use by the electronically-controlled components associated with the fuel reformer 11 such as the power supply 20. It should be appreciated that, similar to the A/D converter described above, the D/A converter may be embodied as a discrete device or number of devices, or may be integrated into the microprocessor 32. It should also be appreciated that if any one or more of the electronically-controlled components associated with the fuel reformer 11 operate on a digital input signal, the analog interface circuit may be bypassed.

Hence, the reformer controller 18 may be operated to control operation of the fuel reformer 11. In particular, the reformer controller 18 executes a routine including, amongst other things, a closed-loop control scheme in which the reformer controller 18 monitors outputs of the sensors associated with the fuel reformer 11 in order to control the inputs to the electronically-controlled components associated therewith. To do so, the reformer controller 18 communicates with the sensors associated with the fuel reformer in order to determine, amongst numerous other things, the amount, temperature, and/or pressure of air and/or fuel being supplied to the fuel reformer 11, the amount of oxygen in the reformate gas, the temperature of the reformate gas being produced thereby, and the composition of the reformate gas. Armed with this data, the reformer controller 18 performs numerous calculations each second, including looking up values in preprogrammed tables, in order to execute algorithms to perform such functions as determining when or how long the fuel reformer's fuel injector or other fuel input device is opened, controlling the power level input to the fuel reformer, controlling the amount of air advanced through the air inlet valve(s), etcetera.

The reformer controller 18 is electrically coupled to a power supply 20 associated with the fuel reformer 11 via a signal line 22. As such, the reformer controller 18 communicates with the power supply 20 to selectively operate and shutdown the fuel reformer 11. Collectively, the fuel reformer 11 and the reformer controller 18 define a fuel reformer system 24 which, among other uses, may be used in the construction of an onboard system for a vehicle or as part of a stationary power generator.

The engine 12, on the other hand, is under the control of an engine control unit 26. In particular, the engine control unit 26 is electrically coupled to a number of electronically-controlled components associated with the engine 12 (e.g., a fuel injector assembly, ignition assembly, etcetera) via a signal line 28. As with the signal lines associated with the fuel reformer 11, the signal line 28 may be any type of signal carrying connector including a wiring harness for carrying the electrical signals associated with numerous engine components.

The reformer controller 18 and the engine control unit 26 are in communication with one another. In particular, the reformer controller 18 is electrically coupled to the engine control unit 26 via a signal line 30.

Figure 2:
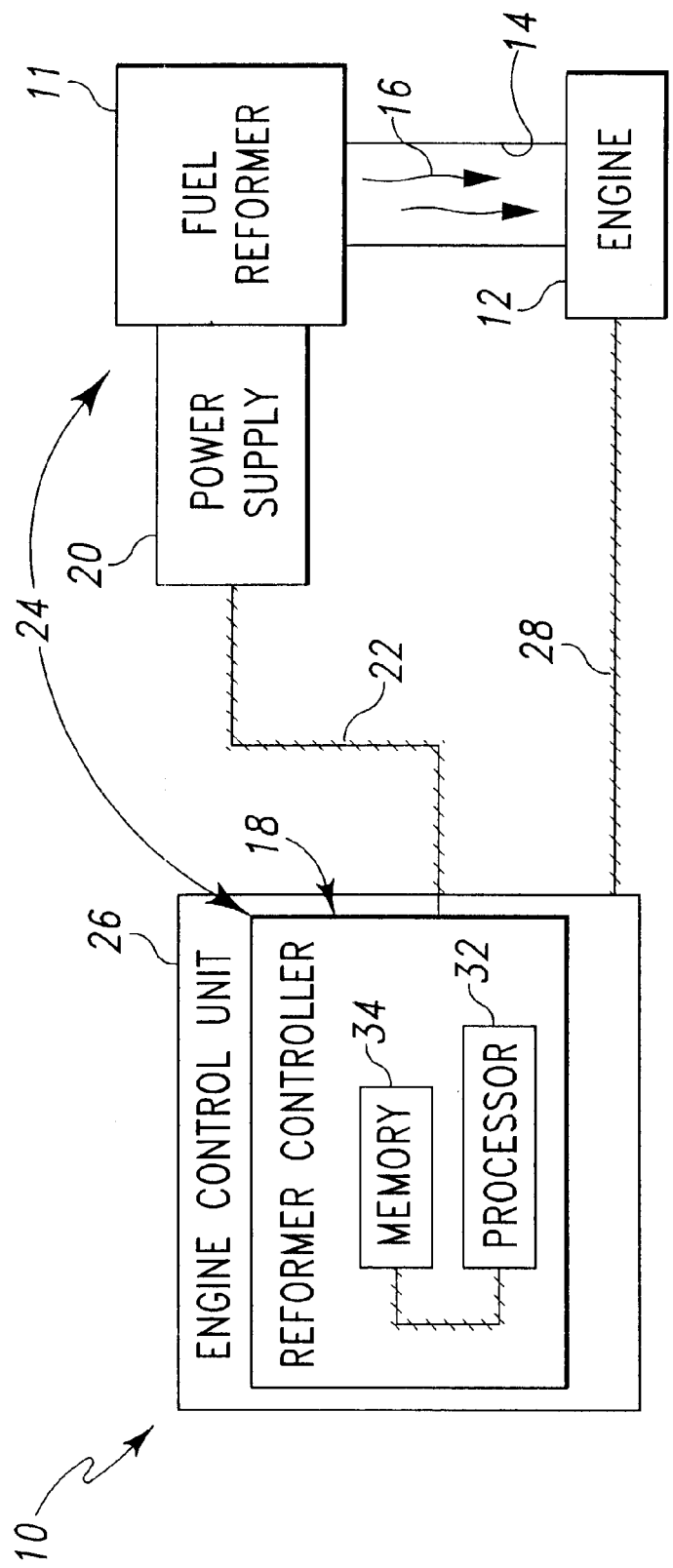
FIG. 2 is a simplified block diagram similar to FIG. 1 except that the reformer controller is integrated into the engine control unit.

The reformer controller 18 and the engine control unit 26 are shown as discrete components in FIG. 1. It should be appreciated, however, that the reformer controller 18 may be integrated into an engine control unit 26 as shown in FIG. 2. In such a way, a single hardware component may be utilized to control both the fuel reformer 11 and the engine 12.

Hence, the aforedescribed control scheme may be utilized to control operation of the fuel reformer 11 and the engine 12. In an exemplary embodiment, the aforedescribed control scheme includes a routine for purging reformate gas 16 from the passageway 14. In particular, in certain system designs, it may be desirable to have the passageway 14 between the outlet of the fuel reformer 11 and the engine 12 substantially devoid of reformate gas 16 when the engine 12 is not being operated. To do so, the passageway 14 may be selectively purged of reformate gas 16.

To purge the passageway 14 of reformate gas 16, the engine 12 may be operated for a predetermined period of time subsequent to shutdown (i.e., cessation of operation) of the fuel reformer 11. In particular, as shall be discussed in more detail below, during shutdown of the engine 12, the reformer controller 18 and the engine control unit 26 cooperate to continue operation of the engine 12 for a predetermined period of time subsequent to shutdown of the fuel reformer 11 to purge reformats gas 16 from the passageway 14. More specifically, by operating the engine 12 for a predetermined period of time subsequent to shutdown of the fuel reformer 11, reformate gas 16 present in the passageway 14 is advanced into the intake of the engine 12 and subsequently combusted by the engine 12 prior to shutdown thereof.

Figure 3:
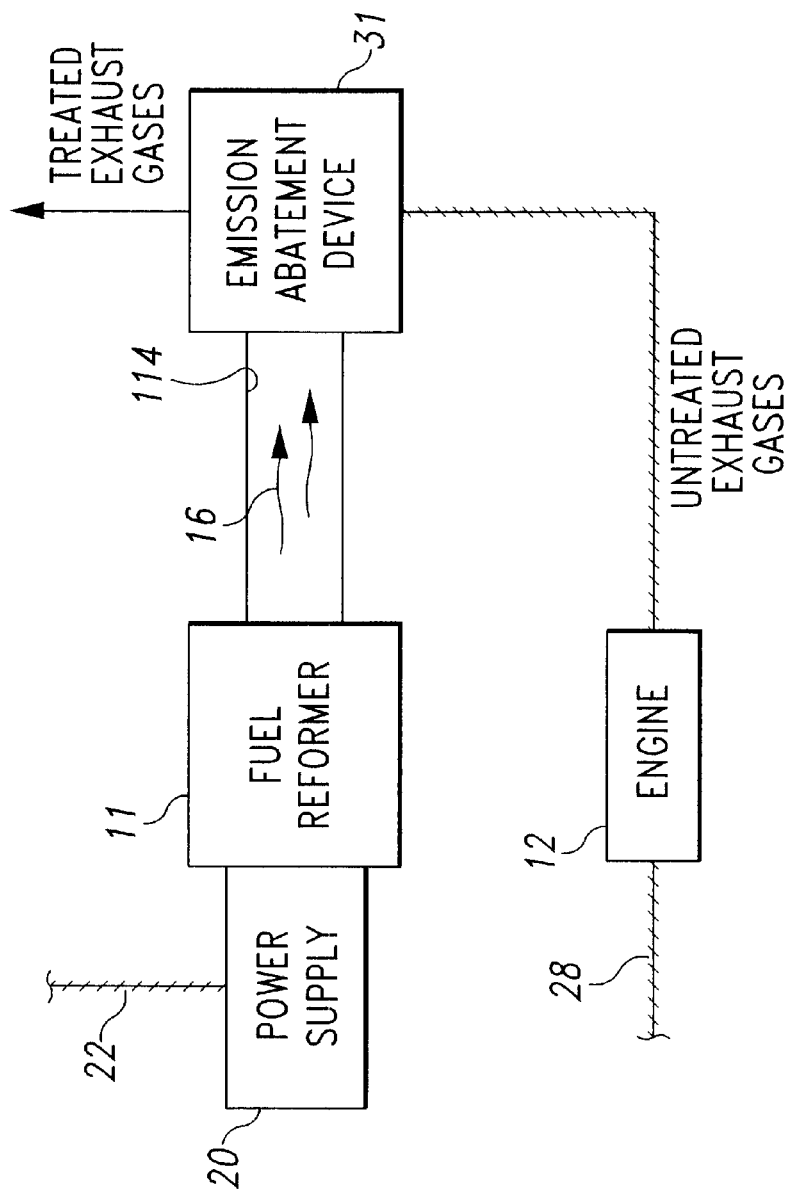
FIG. 3 is a simplified block diagram showing a flow of reformate gas from the fuel reformer through a passageway to an emission abatement device.

As shown in FIG. 3, the reformate gas 16 produced by the fuel reformer 11 may be used to regenerate or otherwise condition an emission abatement device 31 associated with the engine 12 to treat exhaust gases discharged from the engine 12. The emission abatement device 31 may be embodied as any type of emission device such as an absorber catalyst including a NOX and/or SOX trap, a soot trap, or any other type of device.

A passageway 114 interconnects the fuel reformer 11 and the emission abatement device 31 to conduct reformate gas 16 to the emission abatement device 31. As with the systems described above in regard to FIGS. 1 and 2, in certain system designs, it may be desirable to have the passageway 114 substantially devoid of reformate gas 16 when the engine 12 is not being operated. To do so, the passageway 114 may be purged of reformate gas 16 by operation of the engine 12 for a predetermined period of time subsequent to shutdown of the fuel reformer 11 in the manner described above.

It should be appreciated that reformate gas produced by the fuel reformer 11 may also be supplied to a fuel cell (not shown) via a passageway extending from the fuel reformer 11 to the fuel cell. If desired, the passageway extending between the fuel reformer 11 and the fuel cell may also be purged by operation of the engine 12 for a predetermined period of time subsequent to shutdown of the fuel reformer 11.

Figure 4:
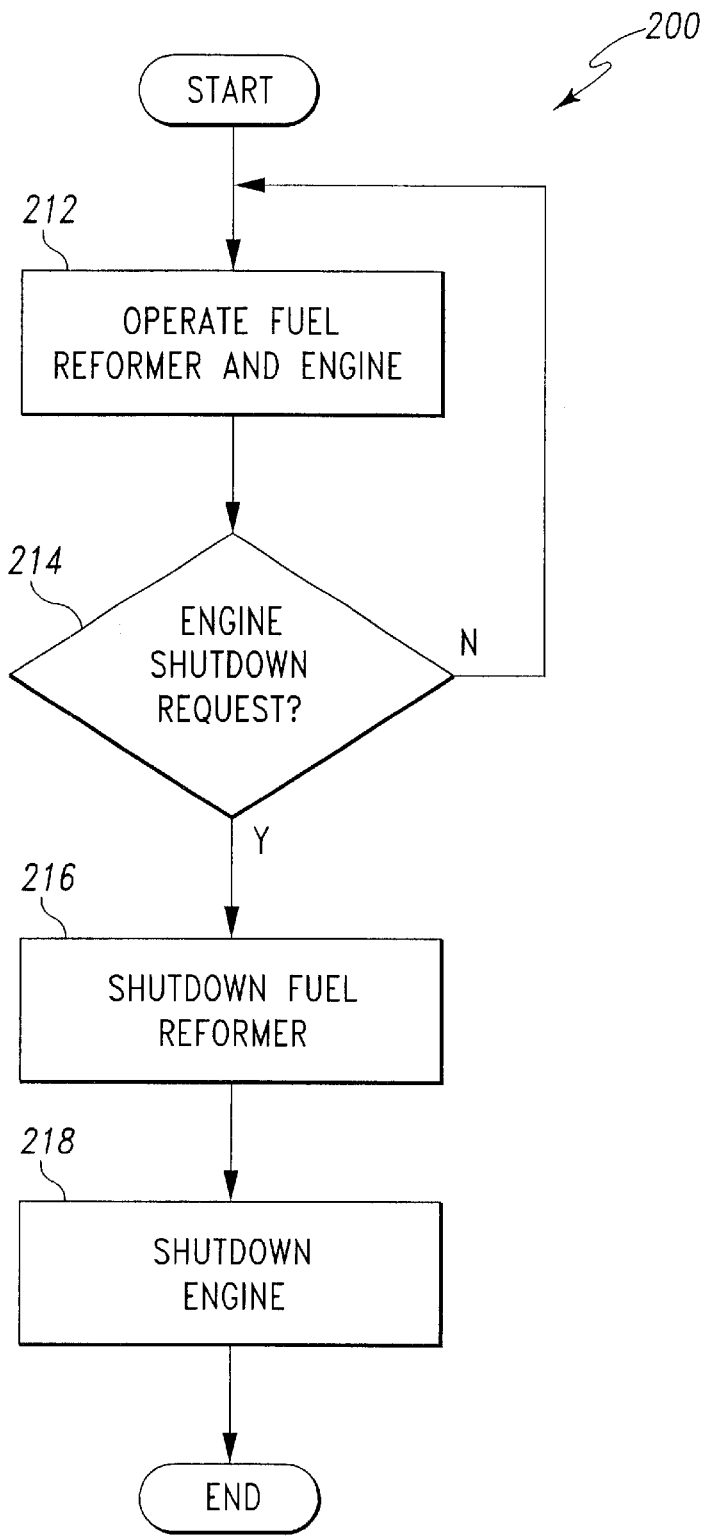
FIG. 4 is a flowchart of a control routine for performing a sequenced shutdown of the fuel reformer and the engine.

Referring now to FIG. 4, there is shown a control routine 200 for controlling operation of the fuel reformer 11 and the engine 12 during the performance of a sequenced shutdown of the fuel reformer 11 and the engine 12 to purge reformate gas 16 from the reformer's outlet passageway (e.g., passageways 14, 114). For purposes of the following description, the reformer controller 18 and the engine control unit 26 are presumed to be discrete (i.e., separate) devices (such as shown in FIG. 1). However, it should be appreciated that a similar control routine could be executed by a control system in which the reformer controller 18 and the engine control unit 26 are embodied as an integrated device.

As shown in FIG. 4, the routine 200 begins with step 212 in which the fuel reformer 11 and the engine are being operated under the control of the respective controllers. Specifically, the fuel reformer 11 is being operated under the control of the reformer controller 18 so as to produce reformate gas which may be supplied to, for example, the intake of the engine 12, the emission abatement device 31, a fuel cell (not shown), etcetera. The engine 12, on the other hand, is operated under the control of the engine control unit 26 so as to produce mechanical output.

During such operation of the fuel reformer 11 and the engine 12, the control routine 200, at step 214, determines if a request to shutdown the engine 12 (i.e., an engine shutdown request) has been executed. An example of an engine shutdown request is turning an ignition key associated with the engine 12 from an on position to an off position. However, it should be appreciated that an engine shutdown request may take many different forms including, for example, an automatic shutdown request generated by a software control routine or the like, a timed shutdown request, or any other manual, software, or hardware-driven shutdown request. As such, in step 214, if the control routine 200 detects an engine shutdown request, a control signal is generated and the routine 200 advances to step 216. If the control routine 200 does not detect an engine shutdown request, the routine 200 loops back to step 212 to continue operation of the fuel reformer 11 and the engine 12.

In step 216, the reformer controller 18 shuts down (i.e., ceases operation of) the fuel reformer 11. In particular, the reformer controller 18 generates an output signal on the signal line 22 so as to cease operation of the fuel reformer 11. More specifically, the reformer controller 11 communicates with the power supply 20 so as to shutdown the fuel reformer 11 thereby ceasing production of reformate gas by the fuel reformer 11. A control signal is generated, and the routine 200 advances to step 218.

In step 218, the engine is shutdown. In particular, the reformer controller 18 communicates with the engine control unit 26 to indicate to the engine control unit 26 that the fuel reformer 11 has been shut down. In response, the engine control unit 26 shuts down (i.e., ceases operation of) the engine 12. It should be appreciated that the engine control unit 26 may continue operation of the engine 12 for a predetermined period of time subsequent to when the fuel reformer 11 is shut down. In particular, upon receipt of the signal from the reformer controller 18 indicating that the fuel reformer 11 has been shutdown, the engine control unit 26 may be configured to continue operation of the engine 12 for a predetermined period of time prior to shutting down the engine 12.

In such a way, reformate gas is purged from the outlet passageway of the fuel reformer (e.g., passageways 14, 114). In particular, in the case of when the reformate gas produced by the fuel reformer 11 is being supplied to the input of the engine 12 (see FIGS. 1 and 2), operation of the engine 12 for a period of time subsequent to shutdown of the fuel reformer 11 causes the reformate gas in the passageway 14 to be advanced into the intake of the engine 12 and subsequently combusted. In the case of when the reformate gas produced by the fuel reformer 11 is being supplied to an emission abatement device 31 (see FIG. 3), operation of the engine 12 for a period of time subsequent to shutdown of the fuel reformer 11 causes the reformate gas in the passageway 114 to be advanced to the emission abatement device 31 thereby purging the reformate gas from the passageway 114.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the system and method described herein. It will be noted that alternative embodiments of the system and method of the present disclosure may not include all of the features described yet still benefit from at least some of the advantages of such features. Those of ordinary skill in the art may readily devise their own implementations of a system and method that incorporate one or more of the features of the present disclosure and fall within the spirit and scope of the present invention as defined by the appended claims.

What is claimed is:

1. A method of operating a power system, the method comprising:
    operating a fuel reformer to reform a fuel to produce a reformate gas;
    advancing the reformate gas into an internal combustion engine;
    detecting an engine shutdown request;
    ceasing operation of the fuel reformer in response to detection of the shutdown request and generating a reformer-shutdown control signal in response thereto; and
    ceasing operation of the engine in response to generation of the reformer-shutdown control signal.

2. The method of claim 1, wherein:
    the advancing step comprises advancing the reformate gas from the fuel reformer into the engine via a passageway; and
    the step of ceasing operation of the engine comprises operating the engine for a predetermined period of time subsequent to generation of the reformer-shutdown control signal to purge the reformate gas produced by the fuel reformer from the passageway.

3. The method of claim 3 wherein:

the advancing step comprises advancing the reformate gas from the fuel reformer into the engine via a passageway; and the step of ceasing operation of the engine in response to generation of the reformer-shutdown control signal comprises operating the engine for a predetermined period of time subsequent to cessation of operation of the fuel reformer to purge the reformate gas produced by the fuel reformer from the passageway.

4. The method of claim 1, wherein the step of ceasing operation of the engine comprises:

determining when a predetermined period of time has elapsed since generation of the reformer-shutdown control signal and generating a time-lapsed control signal in response thereto; and ceasing operation of the engine in response to generation of the time-lapsed control signal.

5. The method of claim 4, wherein:

the advancing step comprises advancing the reformate gas from the fuel reformer into the engine via a passageway; and the step of ceasing operation of the engine in response to generation of the time-lapsed control signal comprises operating the engine for a predetermined period of time subsequent to cessation of operation of the fuel reformer to purge the reformate gas produced by the fuel reformer from the passageway.

6. The method of claim 1, further comprising generating a commence-shutdown control signal in response to detecting the engine shutdown request and the step of ceasing operation of the fuel reformer comprises ceasing operation of the fuel reformer in response to the commence-shutdown control signal.

7. The method of claim 1, wherein:

the fuel reformer comprises a plasma fuel reformer, and the step of ceasing operation of the fuel reformer comprises ceasing operation of the plasma fuel reformer.

8. A fuel reformer system for supplying a reformate gas to an internal combustion engine, the fuel reformer system comprising:

a fuel reformer; and a reformer controller electrically coupled to the fuel reformer, the controller comprising (i) a processor, (ii) and a memory device electrically coupled to the processor, the memory device having stored therein a plurality of instructions which, when executed by the processor, causes the processor to:

detect an engine shutdown request and venerate a commence-shutdown control signal in response thereto, and cease operation of the fuel reformer in response to generation of the commence-shutdown control signal, but prior to cessation of operation of the internal combustion engine.

9. The fuel reformer system of claim 8, wherein the reformer controller is integrated into an engine control unit associated with the internal combustion engine.

10. The fuel reformer system of claim 8, wherein the reformer controller is electrically coupled to an engine control unit associated with the internal combustion engine.

11. The fuel reformer system of claim 8, wherein the plurality of instructions, when executed by the processor, further causes the processor to:

generate a reformer-shutdown control signal in response to cessation of operation of the fuel reformer, and communicate the reformer-shutdown signal to an engine control unit associated with the engine.

12. The fuel reformer system of claim 8, wherein the plurality of instructions, when executed by the processor, further causes the processor to:

determine when a predetermined period of time has elapsed since cessation of operation of the fuel reformer and to generate a time-lapsed control signal in response thereto, and communicate the time-lapsed control signal to an engine control unit associated with the engine.

13. The fuel reformer system of claim 8, wherein the fuel reformer comprises a plasma fuel reformer.

14. A method of controlling a fuel reformer, comprising:

detecting an engine shutdown request and generating a commence-shutdown control signal in response thereto; and ceasing operation of a fuel reformer in response to generation of the commence-shutdown control signal.

15. The method of claim 14, wherein the step of ceasing operation of the fuel reformer comprises ceasing operation of the fuel reformer before cessation of operation of an internal combustion engine associated with the fuel reformer.

16. The method of claim 14, further comprising purging a reformate gas produced by the fuel reformer from a passageway fluidly coupled to the fuel reformer and an internal combustion engine after cessation of operation of the fuel reformer but before cessation of operation of the engine.

17. The method of claim 14, further comprising purging a reformate gas produced by the fuel reformer from a passageway fluidly coupled to the fuel reformer and an emission abatement device subsequent to cessation of operation of the fuel reformer but before cessation of operation of an internal combustion engine fluidly coupled to the emission abatement device.

18. The method of claim 14, wherein:

the fuel reformer comprises a plasma fuel reformer, and the ceasing step comprises ceasing operation of the plasma fuel reformer in response to generation of the commence-shutdown control signal.

* * * * *